(12) United States Patent
Sasaki et al.

(10) Patent No.: US 8,039,111 B2
(45) Date of Patent: *Oct. 18, 2011

(54) ARTICLE WITH ORGANIC-INORGANIC COMPOSITE FILM

(75) Inventors: Teruyuki Sasaki, Tokyo (JP); Kazutaka Kamitani, Tokyo (JP); Kazuyuki Inoguchi, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 705 days.

This patent is subject to a terminal disclaimer.

(21) Appl. No.: 12/083,038

(22) PCT Filed: Oct. 5, 2006

(86) PCT No.: PCT/JP2006/319945
§ 371 (c)(1),
(2), (4) Date: Apr. 3, 2008

(87) PCT Pub. No.: WO2007/040258
PCT Pub. Date: Apr. 12, 2007

(65) Prior Publication Data
US 2009/0246512 A1 Oct. 1, 2009

(30) Foreign Application Priority Data
Oct. 5, 2005 (JP) .................................. 2005-292620

(51) Int. Cl.
*B32B 9/04* (2006.01)
*B32B 17/06* (2006.01)
*B32B 9/00* (2006.01)
*B32B 13/04* (2006.01)

(52) U.S. Cl. ...................... 428/426; 428/411.1; 428/428; 428/446

(58) Field of Classification Search ................... None
See application file for complete search history.

(56) References Cited

U.S. PATENT DOCUMENTS

| | | | |
|---|---|---|---|
| 4,277,525 A | 7/1981 | Nakayama et al. | |
| 4,865,649 A | 9/1989 | Kashiwagi et al. | |
| 5,424,130 A | 6/1995 | Nakanishi et al. | |
| 5,518,810 A | 5/1996 | Nishihara et al. | |
| 6,465,108 B1 | 10/2002 | Kamitani et al. | |
| 6,589,457 B1 | 7/2003 | Li et al. | |
| 6,620,514 B1 * | 9/2003 | Arpac et al. | 428/447 |
| 6,855,396 B1 * | 2/2005 | Mennig et al. | 428/144 |
| 7,749,606 B2 * | 7/2010 | Inoguchi et al. | 428/446 |
| 2003/0027967 A1 | 2/2003 | Hori et al. | |
| 2003/0146415 A1 | 8/2003 | Minami et al. | |
| 2003/0173545 A1 | 9/2003 | Hino et al. | |
| 2007/0212534 A1 | 9/2007 | Sasaki et al. | |

FOREIGN PATENT DOCUMENTS

| | | |
|---|---|---|
| EP | 0 358 011 | 3/1990 |
| EP | 1 541 536 | 6/2005 |
| JP | 50-127930 | 10/1975 |
| JP | 55-034258 | 3/1980 |
| JP | 63-241076 | 10/1988 |
| JP | 63-268722 | 11/1988 |
| JP | 3-56535 | 3/1991 |
| JP | 3-056535 A | 3/1991 |
| JP | 3-212451 | 9/1991 |
| JP | 3-212451 A | 9/1991 |
| JP | 4-338137 | 11/1992 |
| JP | 5-85714 | 4/1993 |
| JP | 6-52796 | 2/1994 |
| JP | 8-27422 | 1/1996 |
| JP | 8-295844 | 11/1996 |
| JP | 9-241829 A | 9/1997 |
| JP | 63-168470 | 7/1998 |
| JP | 11-269657 A | 10/1999 |
| JP | 2001-079980 A | 3/2001 |
| JP | 2002-003751 A | 1/2002 |
| JP | 2002-166488 A | 6/2002 |
| JP | 2002-338304 | 11/2002 |
| JP | 2002-338304 A | 11/2002 |
| JP | 2002-348542 | 12/2002 |
| JP | 2003-277537 | 10/2003 |
| JP | 2003-277537 A | 10/2003 |

(Continued)

OTHER PUBLICATIONS

Prené, P. et al. "Preparation of a Sol-Gel Broadband Antireflective and Scratch-Resistant Coating for Amplifier Blastshields of the French Laser LIL", Journal of Sol-Gel Science and Technology, vol. 19, 2000, pp. 533-537.

Wen, J. et al. "Abrasion Resistant Inorganic/Organic Coating Materials Prepared by the Sol-Gel Method", Journal of Sol-Gel Science and Technology, vol. 5, No. 2, Jan. 1, 1995, pp. 115-126.

Wen, J. et al. "Organic/Inorganic Hybrid Network Materials by the Sol-Gel Approach", Chemistry of Materials, vol. 8, No. 8, Jan. 1, 1996, pp. 1667-1687.

*Primary Examiner* — Sheeba Ahmed
(74) *Attorney, Agent, or Firm* — Hamre, Schumann, Mueller & Larson, P.C.

(57) ABSTRACT

An article with a silica-based film that contains an organic material and has excellent mechanical strength. This article includes a substrate and an organic-inorganic composite film that is formed on the surface of the substrate. The organic-inorganic composite film contains silica as its main component. A value of (0.19A+0.03) or lower (A denotes the film thickness [μm]) is obtained through X-ray diffraction analysis on the organic-inorganic composite film, with the X-ray incident angle being fixed at 1° with respect to the surface of the organic-inorganic composite film, when the intensity of a peak at a diffraction angle of 3° to 10° is standardized using the intensity of a halo pattern peak at a diffraction angle of 20° to 30°. A value of 0.25 or lower is obtained through Fourier transform infrared spectroscopy analysis on the organic-inorganic composite film, when the intensity of a peak at around 950 cm$^{-1}$ based on a Si—OH group is standardized using the intensity of a peak at around 1100 cm$^{-1}$ based on a Si—O—Si bond.

9 Claims, 1 Drawing Sheet

FOREIGN PATENT DOCUMENTS

| | | |
|---|---|---|
| JP | 2005-163035 A | 6/2005 |
| JP | 2005-263935 A | 9/2005 |
| WO | 01/30922 | 5/2001 |
| WO | 02/53345 | 7/2002 |
| WO | WO 02/074447 | 9/2002 |
| WO | 2004/011381 | 2/2004 |
| WO | WO 2005/087876 A1 | 9/2005 |

* cited by examiner

ARTICLE WITH ORGANIC-INORGANIC COMPOSITE FILM

TECHNICAL FIELD

The present invention relates to an article with an organic-inorganic composite film.

BACKGROUND ART

Generally, glass materials are hard and also can be used in the form of films that coat substrates. However, when employing a melting method, a high temperature treatment is necessary to obtain a vitreous film. This limits the materials that the substrates and coating films can contain.

The sol-gel process is a process of obtaining an oxide in a solid state by: using a solution of an organic or inorganic compound of metal as a starting material; rendering the solution into a sol in which fine particles of metal oxides or hydroxides have dissolved through the hydrolysis reaction and polycondensation reaction of the compound contained in the solution; further gelling and solidifying the sol; and heating this gel.

The sol-gel process allows vitreous films to be produced at lower temperatures. A processes of forming silica-based films by the sol-gel process is disclosed in JP11(1999)-269657A, for example.

Generally, the silica-based films formed by the sol-gel process have lower mechanical strength than that of vitreous films obtained by the melting method.

JP11(1999)-269657A discloses a process for producing a silica-based film by applying an alcohol solution that is used as a coating solution to a substrate. The alcohol solution contains 0.010 to 3 wt %, in terms of silica, of at least one selected from silicon alkoxide and hydrolysate thereof (including partial hydrolysate), 0.0010 to 1.0N of acid, and 0 to 10 wt % of water.

The silica-based film obtained by this process has strength to an extent that allows the film to withstand the dry abrasion test. It probably cannot be said that the silica-based film has sufficiently high strength, but it has high mechanical strength for a film obtained by the sol-gel process. However, in the case of the silica-based film that can be formed by the process disclosed in JP11(1999)-269657A, the thickness thereof is limited to 250 nm maximum when consideration is given to obtaining an appearance that is good enough for practical use. The thickness of the silica-based film that is formed by the sol-gel process is generally around 100 to 200 nm.

It is possible to thicken the silica-based film by applying the coating solution multiple times to form a multiple layer. However, this may deteriorate the adhesion between the surfaces of each layer, reducing the abrasion resistance of the silica-based film. Another problem is that the process for producing the silica-based film becomes more complex.

Consequently, it is difficult to obtain a silica-based film that has a thickness exceeding 250 nm and has excellent mechanical strength.

A technique of forming an organic-inorganic composite film by the sol-gel process has been proposed. The film contains an inorganic material and an organic material that are composited. The sol-gel process is characterized by film formation that is carried out at a lower temperature. Accordingly, it allows a silica-based film containing an organic material to be formed. Organic-inorganic composite films that are formed by the sol-gel process are disclosed in JP3 (1991)-212451A, JP3 (1991)-56535A, and JP2002-338304A, for example.

In order to improve the mechanical strength of the silica-based film that is formed by the sol-gel process, it is desirable to heat-treat the silica-based film at 450° C. or higher. However, when an organic-inorganic composite film is heat-treated at a high temperature of this level, the organic material in the film will decompose. The restriction that the film must be heat-treated at a temperature in the range that does not cause the organic material to decompose limits the improvement in mechanical strength of the film to be formed, not only in the sol-gel process but also in the liquid-phase film formation methods other than that. Hence, it has been considered that it is difficult to form a silica-based film that has excellent mechanical strength when the film contains an organic material.

DISCLOSURE OF INVENTION

The present invention is intended to provide a silica-based film having excellent mechanical strength while containing an organic material.

The present invention provides an article with an organic-inorganic composite film. The article includes a substrate and an organic-inorganic composite film that is formed on the surface of the substrate and contains an organic material and an inorganic oxide. The organic-inorganic composite film contains silica as the inorganic oxide. The organic-inorganic composite film contains the silica as its main component. A value of (0.19A+0.03) or lower is obtained through X-ray diffraction analysis on the organic-inorganic composite film, with the X-ray incident angle being fixed at 1° with respect to the surface of the organic-inorganic composite film, when the thickness of the organic-inorganic composite film is denoted as A μm and the intensity of a peak at a diffraction angle of 3° to 10° is standardized using the intensity of a halo pattern peak at a diffraction angle of 20° to 30°. A value of 0.25 or lower is obtained through Fourier transform infrared spectroscopy analysis on the organic-inorganic composite film, when the intensity of a peak at around 950 cm$^{-1}$ based on a Si—OH group is standardized using the intensity of a peak at around 1100 cm$^{-1}$ based on a Si—O—Si bond.

In this description, the term "main component" denotes a component whose content is the highest. The content is determined in terms of mass %.

According to the present invention, an organic-inorganic composite film that has excellent mechanical strength even when having a thickness exceeding 0.25 μm can be formed by the sol-gel process. The organic-inorganic composite film of the present invention can have excellent abrasion resistance that is comparable to that of a glass sheet obtained by the melting method, even though it contains the organic material.

BEST MODE FOR CARRYING OUT THE INVENTION

In the present invention, a value of (0.19A+0.03) or lower should be obtained through X-ray diffraction analysis on the organic-inorganic composite film, with the X-ray incident angle being fixed at 10 with respect to the surface of the organic-inorganic composite film, when the thickness of the organic-inorganic composite film is denoted as A μm (A>0)

and the intensity of a peak at a diffraction angle of 3° to 10° is standardized using the intensity of a halo pattern peak at a diffraction angle of 20° to 30°. The value of (0.19A+0.03) tends to be small in a film having a fine dense structure with fewer micro-pores.

Figure 1:
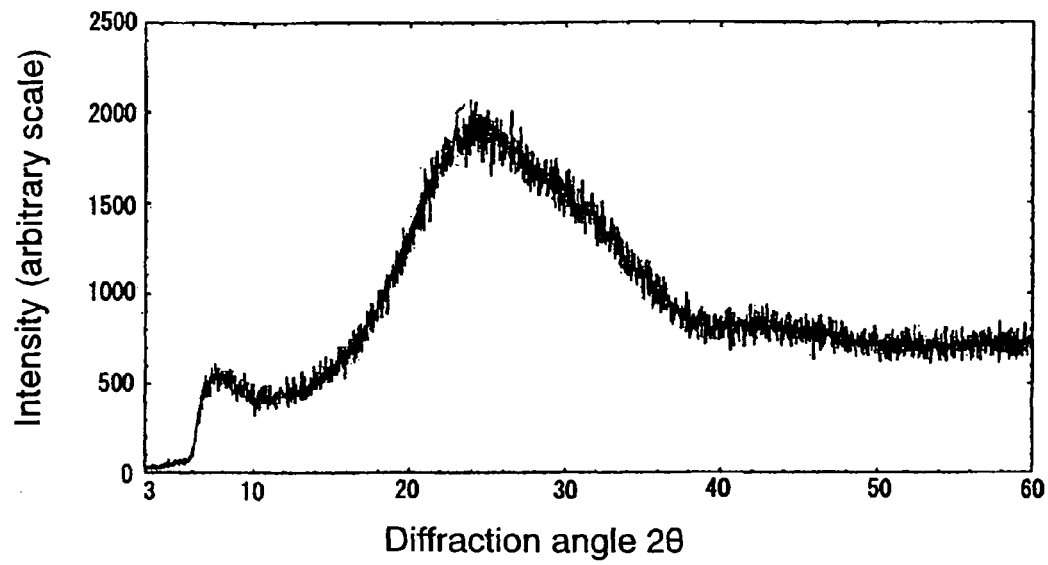
FIG. 1 is an example of X-ray diffraction chart of the organic-inorganic composite film of the present invention.
Figure 2:
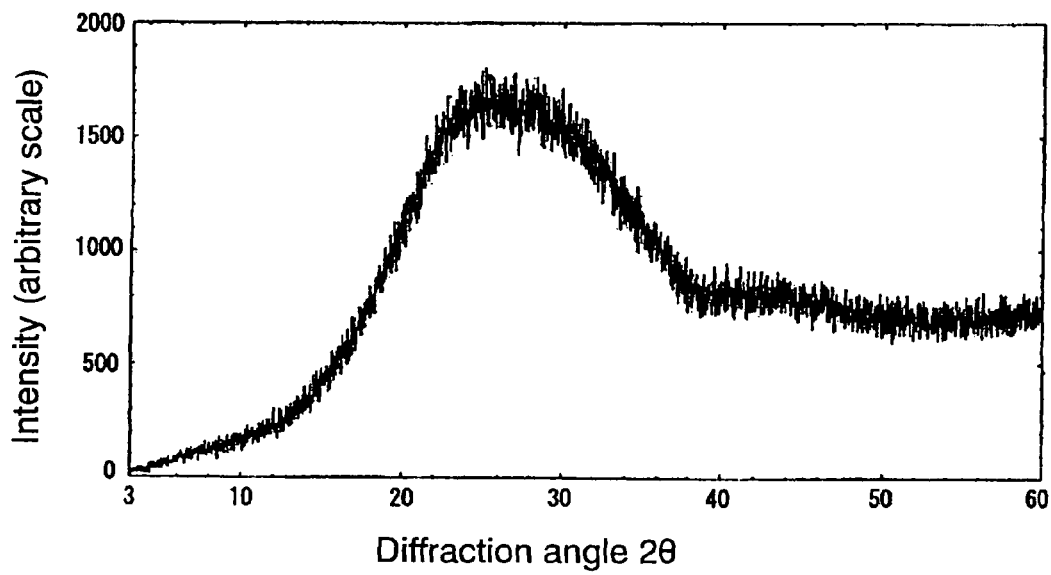
FIG. 2 is an example of X-ray diffraction chart of a glass substrate.

FIG. 1 is a chart obtained through X-ray diffraction analysis on the organic-inorganic composite film according to the present invention. FIG. 2 is a chart obtained through X-ray diffraction analysis on a glass sheet without a film. In these two charts, a strong halo pattern peak appears at a diffraction angle of 20° to 30°. This peak is based on a Si—O—Si bond in the glass network. In FIG. 1, a smaller peak appears at a diffraction angle of 30 to 10°.

According to various analyses made by the inventor, it is conceivable that this smaller peak reflects the volume of the micro-pores in the amorphous portion of the film. An index (P1/P2) that denotes the ratio of micro-pores in the film thus can be obtained, where the intensity (P1) of a peak at a diffraction angle of 3° to 10° is standardized using the intensity (P2) of a peak at a diffraction angle of around 20°. The index (P1/P2), obtained from the chart of FIG. 1, is about 0.52.

The volume of the micro-pores allowable in the fine structure depends on the film thickness. The value (P1/P2) obtained through the standardization should be (0.19A+0.03) or lower when the film thickness is denoted as A µm to provide a film having a fine mechanical characteristic.

A film with a small number of micro-pores, however, may not have a fine mechanical character. A film with a small number of micro-pores does not have higher mechanical strength unless the Si—O—Si bond in the network of the film has been developed sufficiently. In the present invention, the Si—O—Si bond thus should be developed to an extent that an index (P3/P4) of 0.25 or lower is obtained through Fourier transform infrared spectroscopy analysis on the organic-inorganic composite film, when the intensity (P3) of a peak at around 950 cm$^{-1}$ based on a Si—OH group is standardized using the intensity (P4) of a peak at around 1100 cm$^{-1}$ based on a Si—O—Si bond.

According to the present invention, excellent mechanical strength can be achieved even if the organic-inorganic composite film has a thickness exceeding 0.25 µm but not more than 5 µm, further exceeding 0.3 µm but no more than 5 µm, for example, exceeding 1 µm but no more than 5 µm.

According to the present invention, the mechanical strength of the organic-inorganic composite film can be improved to an extent that the organic-inorganic composite film does not separate from the substrate after the Taber abrasion test prescribed in Japanese Industrial Standards (JIS) R 3212 that is carried out with respect to the surface of the organic-inorganic composite film. The Taber abrasion test according to JIS R 3212 can be carried out using a commercially available Taber abrasion tester. This test is an abrasion test that is carried out at a rotation number of 1000, with a load of 500 g being applied, as prescribed in the JIS. The present invention also allows a portion that has been subjected to the Taber abrasion test to maintain a haze ratio of 4% or lower after the Taber abrasion test.

The practical thickness ($A_m$) of the organic-inorganic composite film is denoted as the film-thickness A when the film does not contain a crystal (indium tin oxide, for example); When the film contains the crystal, a value (converted film thickness: $A_c$), obtained through multiplying the volume ratio of the components other than the crystalline materials in the film by the practical thickness, is denoted as the film-thickness A.

An embodiment of the method for improving the mechanical strength of the film is described below.

In the case of the sol-gel process using silicon alkoxide as a starting material, the silicon alkoxide in the film-forming solution (coating solution) forms an oligomer having siloxane bonds through the hydrolysis reaction and polycondensation reaction in the presence of water and a catalyst (acid or alkali) in the coating solution, and thereby the coating solution is changed into a sol state.

Preparation of the coating solution avoiding an excess enlargement in the average molecular weight of the oligomer derived from the silicon alkoxide therein is essential to improve the mechanical strength of the film. Concentration of the silicon alkoxide in the solution as well as pH and the stirring period of the solution affects the average molecular weight of the oligomer (condensation product of hydrolyzed silicon alkoxide) derived from the silicon alkoxide in the coating solution. A film having fine mechanical strength tends to be obtained through controlling these factors so as to regulate the mass-average molecular weight of the condensation product of the hydrolyzed silicon alkoxide in the coating solution for applying on a substrate in the range of 20000 or less, further 15000 or less, particularly 10000 or less, preferably 5000 or less, more preferably 3000 or less, further preferably 2000 or less, particularly preferably 1800 or less, most preferably 1500 or less.

The excess enlargement in the average molecular weight of the oligomer derived from the silicon alkoxide in the coating solution tends to generate a secondary particle having a cyclic structure. The cyclic structure of the secondary particle tends to cause micro-pores in the film. Therefore, it is preferable to suppress the generation of the secondary particle in the coating solution in order to obtain a film having a small number of micro-pores as well as fine mechanical strength. Although the amount of the cyclic structure does not depend only on the average molecular weight of the oligomer, it is enough to control the oligomer in the coating solution to have a small average molecular weight in order to suppress the development of the cyclic structure.

In a Sol-Gel process, the film-forming solution is generally applied on a substrate after having been stirred for a long period. However, when the stirring period is too long, the average molecular weight of the silicon-alkoxide-based oligomer becomes too large in some cases. Although the average molecular weight of the oligomer in the coating solution is not determined only by the stirring period of the solution, the average molecular weight of the oligomer tends to become excessively large when a usual stirring period is applied.

The pH of the coating solution can be controlled to around 1-3. Silanol has an isoelectric point of 2. Thus, the silanol exists stably in the coating solution whose pH is around 1-3. This allows the generation of the secondary particle due to the progress of the dehydration condensation reaction to be suppressed.

The solution will have a pH of around 3 to 1 when a strong acid is added to the coating solution so that the mass molality of protons (hereinafter also referred to simply as "proton concentration") that is obtained, assuming that the protons have dissociated completely from the strong acid, is approximately 0.001 to 0.1 mol/kg.

The coating solution contains a mixed solvent of water and alcohol, but another solvent can be added thereto if necessary. Similarly in the case of using such a mixed solvent, a solution having a pH of around 2 can be obtained by using a strong acid and adding it so that the molality of protons that is obtained, assuming that the protons have dissociated completely from the strong acid, is 0.001 to 0.2 mol/kg.

For the calculation of the molality of protons, protons of the acid to be used whose acid dissociation constant in water is 4 or higher do not need to be taken into account. For instance, since the acid dissociation constant of acetic acid, which is a weak acid, in water is 4.8, the protons of the acetic acid are not included in the proton concentration even when acetic acid is contained in the coating solution.

Furthermore, for example, phosphoric acid has three dissociation stages and three protons per molecule can be dissociated. The dissociation constant at the first stage is 2.15, which allows the phosphoric acid to be considered as a strong acid. However, the dissociation constant at the second stage is 7.2 and that at the third stage is even higher. Hence, the proton concentration that is determined, assuming that the protons have dissociated from the strong acid, can be calculated on the assumption that only one proton dissociates from one molecule of the phosphoric acid. The phosphoric acid from which one proton has dissociated is no longer a strong acid. Accordingly, the dissociation of protons at and after the second stage does not need to be taken into account. In this description, the strong acid denotes, specifically, an acid having protons whose acid dissociation constant in water is lower than 4.

The reason why the proton concentration is defined as a concentration that is determined when the protons have dissociated completely from the strong acid is as follows. That is because in a mixed solution of water and an organic solvent such as alcohol, it is difficult to determine the degree of dissociation of a strong acid accurately.

When the coating solution is applied to the substrate surface and then dried while being maintained at a pH of around 1 to 3 and being controlled so as to avoid the enlargement in the average molecular weight of the material derived from the silicon alkoxide, the film is filled densely with oligomer that is in a lower polymerized state. Accordingly, a considerably dense film with micro-pores can be obtained.

Although this film is dense, the hardness thereof does not become higher than a certain degree due to insufficient hydrolysis and polycondensation reaction even when it is heated at around 200° C. Hence, excess water can be added to silicon alkoxide so that the hydrolysis and polycondensation reaction of silicon alkoxide is facilitated after the application. In the state where hydrolysis and polycondensation reaction progress readily, the film is cured more easily even if it is not heated to a high temperature. Specifically, water having a maximum number of moles that is required for hydrolysis, i.e. a number of moles that is at least four times the total number of moles of silicon atoms in silicon alkoxide, is added.

In the drying step, water evaporates in parallel with the volatilization of the solvent. When this is taken into consideration, it is preferable that the number of moles of water be more than four times, for example, 4 to 20 times, more preferably 5 to 20 times the total number of moles of the silicon atoms.

In silicon alkoxide, a maximum of four alkoxyl groups can bind to one silicon atom. Alkoxide that has a small number of alkoxyl groups requires a smaller number of moles of water for hydrolysis. Furthermore, even in the case of tetraalkoxysilane in which four alkoxyl groups have bound to a silicon atom, the total number of moles of water required for hydrolysis of a polymerized material thereof (that is commercially available as, for instance, "Ethyl silicate 40" manufactured by COLCOAT Co., Ltd.) is less than four times that of the silicon atoms (the number of moles of water required for hydrolysis stoichiometrically is (2n+2) moles where n denotes the number of moles of Si contained in the polymerized material ($n \geq 2$)). The higher the polymerization degree of the alkoxysilane material to be used, the smaller the number of moles of water required for hydrolysis. Hence, practically, the number of moles of water required for the hydrolysis of silicon alkoxide may be less than four times the total number of moles of silicon atoms in the silicon alkoxide. However, in view of the fact that the addition of excess water is preferred, water is added in a number of moles at least four times, preferably more than 4 times, more preferably at least five times the total number of moles of silicon atoms.

Addition of water whose number of moles exceeds that required for stoichiometric hydrolysis accelerates the hydrolysis and polycondensation reaction of silicon alkoxide in the drying step. This is because water evaporation in the drying step induces a large capillary shrinkage and facilitates a diffusion and condensation of silicon alkoxide. The variation of pH of the applied solution from the above-mentioned range due to volatilization of the solvent and vaporization of water also is one of the factors that accelerate hydrolysis and polycondensation reaction. By forming a dense film and allowing the hydrolysis and polycondensation reaction to progress sufficiently as described above, a hard film is formed. As a result, a film with excellent mechanical strength can be obtained through a heat treatment that is carried out at a lower temperature than that employed conventionally.

The use of this method makes it possible to obtain a silica-based film that has excellent mechanical strength although it is thick. A thick film can be obtained by preparing the coating solution so that the concentration of silicon alkoxide is relatively high, for example, the silicon atoms contained in the silicon alkoxide exceeds 3 mass % in terms of the $SiO_2$ concentration when the silicon atoms are expressed as $SiO_2$.

In the above-described process, since the film can be heated at a lower temperature, organic material remains in the film without being decomposed even if it is added to the coating solution. This makes it possible to form a silica-based film that has excellent mechanical strength while containing organic material. Furthermore, a hydrophilic organic polymer may be added to the coating solution. The hydrophilic organic polymer prevents the occurrence of cracks that may accompany the evaporation of fluid components in the coating solution that has been applied. The hydrophilic organic polymer lies between silica particles produced in the solution and thereby alleviates the effect of film shrinkage that accompanies the evaporation of fluid components. Conceivably, the addition of the hydrophilic organic polymer can reduce curing and shrinking of the film and thereby the stress in the film is alleviated. In the present invention, the addition of the organic material serve, in some cases, to maintain the mechanical strength of the film while preventing the film from shrinking.

In the above-described process, since the film can be heated at a lower temperature than that employed conventionally, the hydrophilic organic polymer remains in the film even after heating. According to the present invention, it is possible to obtain a film with excellent mechanical strength while the hydrophilic organic polymer remains in the film even when the film has a further increased thickness.

It is advantageous that the hydrophilic organic polymer is added to the coating solution beforehand. In an organic-inorganic composite film formed of the coating solution, it is conceivable that an organic material and an inorganic material have been compounded on the molecular level.

With reference to various experimental results, the hydrophilic organic polymer seems to prevent the film from becoming porous by preventing the growth of silica particles that are formed through the sol-gel reaction.

Examples of hydrophilic organic polymers include polymers that include polyoxyalkylene groups (polyalkylene oxide structure). Examples of the hydrophilic organic polymers including polyoxyalkylene groups include polyethylene glycol, polyethylene oxide, a dispersant of polyether, and a surfactant. As the hydrophilic organic polymer, polyvinyl caprolactam and a copolymer of PVP (polyvinyl pyrrolidone) and vinyl ether may be used.

With the improvement of the sol-gel process described above, the present invention provides an article with an organic-inorganic composite film formed on a substrate. The organic-inorganic composite film does not separate from the substrate even after having been subjected to the Taber abrasion test prescribed in JIS R 3212 even though it contains an organic material. This Taber abrasion test is an abrasion test that is carried out at a rotation number of 1000, with a load of 500 g being applied, as prescribed in the JIS.

The present invention also allows a portion that has been subjected to the above-mentioned Taber abrasion test to have a haze ratio of 4% or lower, further 3% or lower after the Taber abrasion test. This mechanical strength is comparable to that of a vitreous film obtained by the melting method.

In the organic-inorganic composite film of the present invention, it is preferable that the mass of the organic material be 0.1 to 40%, particularly 2 to 40%, with respect to the total mass of the organic-inorganic composite film. The mechanical strength of the silica-based film may be lowered when too much organic material is present.

The organic-inorganic composite film of the present invention may include a conductive fine particle. Examples of the conductive fine particle include indium tin oxide (ITO). The organic-inorganic composite film of the present invention may contain not only the conductive fine particle but also a functional material such as an organic dye and an ultraviolet absorber. Many of the organic materials that can be used as the functional material often start decomposing at temperatures of 200 to 300° C. The infrared absorbency of the conductive fine particle typified by ITO tends to be deteriorated by heating at a temperature higher than 250° C. The organic-inorganic composite film allows these materials to be contained without deteriorating their function. This is because even a heat treatment at around 200° C. sufficiently cures the film. Adding the hydrophilic organic polymer to the film-forming solution helps diffuse the functional material evenly in the film. Surfactants of phosphoric acid including polyether groups exhibit an advanced ability to disperse it. The coating solution further may include a dispersant.

Examples of the substrate include a glass substrate or a transparent substrate typified by a resin substrate. Using a substrate with a thickness of more than 0.1 mm, further 0.3 mm or more, particularly 0.5 mm or more can prevent the occurrence of cracks and film separation after the Taber test more reliably. Although the upper limit of the thickness is not particularly set, it may be, for example, 20 mm or less, further 10 mm or less.

In the above-described method, a coating solution that contains silicon alkoxide, strong acid, water and alcohol, and further contains an organic material is used. The coating solution contains a hydrophilic organic polymer as the organic material, for example. The hydrophilic organic polymer usually is added as a different component from the strong acid. However, a polymer that functions as a strong acid, for example, a polymer containing a phosphate ester group can be added as at least a part of the strong acid.

This method can be described as follows. This is a process for producing an article with an organic-inorganic composite film. The process includes: applying a film-forming solution for forming the organic-inorganic composite film to the surface of the substrate; and removing at least a part of a fluid component contained in the film-forming solution from the film-forming solution that has been applied to the substrate. The film-forming solution contains silicon alkoxide, strong acid, water, alcohol, and an organic material. The silicon alkoxide has a concentration exceeding 3 mass % in terms of a $SiO_2$ concentration when silicon atoms contained in the silicon alkoxide are expressed as $SiO_2$. The strong acid has a concentration in the range of 0.001 to 0.2 mol/kg in terms of the molality of protons that is obtained, assuming that the protons have dissociated completely from the strong acid. The number of moles of the water is at least four times the total number of moles of the silicon atoms contained in the silicon alkoxide. The mass-average molecular weight of the condensated product of hydrolyzed silicon alkoxide is 20000 or less. Furthermore, at least a part of the fluid component contained in the film-forming solution that has been applied to the substrate is removed, with the substrate being maintained at a temperature of 400° C. or lower.

The silicon alkoxide is preferably at least one selected from tetraalkoxysilane and a material made by polymerization of tetraalkoxysilane, in which a hydrolyzed alkoxyl group may be contained.

The concentration of the silicon alkoxide is at least 3 mass %, and may be 30 mass % or lower, 14 mass % or lower, and further less than 14 mass % in terms of the $SiO_2$ concentration when silicon atoms contained in the silicon alkoxide are expressed as $SiO_2$. When the concentration of the silicon alkoxide is excessively high in the coating film, cracks may occur that can cause the film to separate from the substrate.

The concentration of the organic material should be 30 mass % or lower with respect to the $SiO_2$, in the case where the silicon alkoxide has a concentration of 7 mass % or lower in terms of the $SiO_2$ concentration, and (5B-5) where the $SiO_2$ concentration is denoted as B mass %, in the case where the silicon alkoxide has a concentration exceeding 7 mass % in terms of the $SiO_2$ concentration. Preferably, the concentration of the organic material is at least 0.1 mass %, particularly at least 5 mass % with respect to the $SiO_2$.

It is advantageous that the film-forming solution is applied to the substrate while maintaining an atmosphere at a relative humidity lower than 40% in the applying step. When controlling the relative humidity to be lower than 40%, a silica-based film having a dense structure tends to be formed. This is because the controlling prevents the solution from uptaking excess water derived from the atmosphere. It is further advantageous that the relative humidity is controlled at 30% or lower to improve the abrasion resistance of the silica-based film. The relative humidity preferably is maintained 15% or higher, particularly at 20% or higher, to ease the handling (applying) of the film-forming solution. When applying the film-forming solution, it is important to control the relative humidity of the atmosphere at the range described above for acquiring the excellent abrasion resistance.

It is advantageous that the heat treatment in the removing step is carried out at 400° C. or lower, preferably at 300° C. or lower, more preferably at 250° C. or lower, to prevent an organic material from decomposing. The limit of the lower temperature should be selected in response to the desired film hardness. The heat treatment can be carried out at the temperature of 100° C. or higher, further 150° C. or higher, and 180° C. or higher.

The removing step preferably is carried out with an air-drying step performed at room temperature (25° C.) and a heat treatment step performed after the air-drying step. The heat treating step preferably is performed in an atmosphere at a temperature higher than room temperature but not higher than 400° C., for example, in a range of 100° C. to 400° C. The air-drying step preferably is performed while controlling an atmosphere at a relative humidity lower than 40%, or at not higher than 30%. Controlling the relative humidity at the above mentioned range prevents the occurrence of cracks in the film. The lower relative humidity limit in the air-drying step may be 15% or 20%, but is not restricted.

In the removing step, at least a part of and preferably substantially all of the fluid components, such as water and alcohol, of the film-forming solution that has been applied on the substrate is removed.

According to the above-described method, a thick organic-inorganic composite film with a thickness of, for example, more than 250 nm but not more than 5 g/m can be formed by carrying out each of the following steps once: a step of applying the film-forming solution and a step of removing the fluid components contained in the film-forming solution.

Examples of the strong acid include hydrochloric acid, nitric acid, trichloroacetic acid, trifluoroacetic acid, sulfuric acid, phosphoric acid, methanesulfonic acid, paratoluenesulfonic acid, and oxalic acid. Among strong acids, volatile acids can be used advantageously since they volatilize during heating and thus do not remain in a cured film. When acid remains in the cured film, it may deteriorate the film hardness, since the acid may hinder inorganic components from binding.

The organic-inorganic composite film of the present invention has a comparable film hardness to that of molten glass although it is heat-treated at a relatively lower temperature. This organic-inorganic composite film is suitable for practical use even when it is used for window glasses for automobiles or buildings.

In the present invention, the substrate can be heated when the fluid components are to be removed, if necessary. In this case, the temperature to be employed for heating the substrate should be adjusted suitably according to the heat resistance of the functional material. In the present invention, even if heating is carried out at 100 to 300° C., further 100 to 250° C., the organic-inorganic composite film can be cured sufficiently.

Hereinafter, the present invention is described further in detail using examples.

Example 1

First, 17.36 g of tetraethoxysilane (manufactured by Shin-Etsu Chemical Co., Ltd.), 10.19 g of pure water, 0.10 g of concentrated hydrochloric acid (35 mass %, manufactured by KANTO CHEMICAL CO., INC.), and 0.15 g of a polyether phosphate polymer (manufactured by Lubrizol Japan Ltd.; SOLSPERSE 41000) were added to 72.20 g of ethyl alcohol (manufactured by KATAYAMA CHEMICAL, Inc.). This was stirred at 20° C. for four hours and thus a film-forming solution was obtained.

With respect to this solution, the content (indicated in terms of silica) of silicon alkoxide (tetraethoxysilane), the proton concentration and the concentration of an organic polymer are indicated in Table 1. The concentration of the organic polymer is denoted as a value with respect to the $SiO_2$, where the concentration of silicon alkoxide is represented in terms of the $SiO_2$ concentration.

Subsequently, the film-forming solution was applied to a soda-lime-silicate glass substrate (100×100 mm, 3.1 mm in thickness; the size and thickness of the glass substrate remains the same in examples and comparative examples hereinafter) that had been washed, at a relative humidity (hereinafter referred to simply as "humidity") of 30% and at room temperature by a flow coating method. In this state, it was dried at room temperature for about 30 minutes. Thereafter, it was placed in an oven whose temperature had been raised to 200° C. beforehand and then was heated for 15 minutes. After that, it was cooled. The film thus obtained was a film that had a practical thickness ($A_m$) of 460 nm with high transparency, and was free from cracks.

The hardness of the film was evaluated by the abrasion test according to JIS R 3212. That is, using a commercially available Taber abrasion tester (5150 ABRASER, manufactured by TABER INDUSTRIES), the film was subjected to abrasion 1000 times with a load of 500 g. The haze ratio was measured before and after the abrasion test. Table 2 indicates the film thickness, presence or absence of film separation after the Taber test, and haze ratios that were obtained before and after the Taber test. Table 2 also indicates the haze ratios that were obtained before and after the Taber test of a molten glass sheet, as a blank. The haze ratios were measured using HGM-2DP manufactured by SUGA TEST INSTRUMENTS Co., Ltd.

The X-ray diffraction was measured on a sample of a film that had been formed on a 2.1 mm-thick glass substrate using an X-ray diffraction equipment (RAD-RC manufactured by RIGAKU Corp.) with the following system and conditions.
(System)
 Goniometer: wide-angle goniometer
 Attachment: standard sample holder
 Slit: thin film attachment slit
 Monochromater: counter curved monochromater
 Counter: scintillation counter
(Conditions)
 Tube voltage: 40 kV, tube current: 150 mA
 Offset angle (X-ray incident angle: 2θ/θ+alpha) 1°
 Divergence slit: 0.4 mm
 Light receiving slit: 8.0 mm
 Measurement angle range: 3° to 60°
 Scan speed: 3°/min
 Sampling angle: 0.02°

With respect to the spectrum obtained, the intensity of a peak top at an angle of 3° to 10° was standardized using the intensity of an amorphous halo peak top at an angle of around 20° to 30°. The value thus obtained is hereinafter described as "XRD ratio at low angle/at high angle".

Removal of the background noise (baseline compensation) was carried out using the analysis software provided with the above-described X-ray diffraction equipment.

Infrared absorption spectrum was measured on a film that had been formed on a Si wafer under the same film forming conditions as those described above. The film formed on the Si wafer indicates the same measurement value as the film formed on the glass substrate as long as the value is obtained through the standardization below.

Infrared absorption spectrum was measured on a film that had been formed on the Si wafer using a Fourier transform infrared spectrophotometer (JIS-5500 manufactured by JEOL Ltd.) under the following conditions. Si was used as a reference.
 Measurement method: transmission method
 Detector: TGS (measurement range: 4000 to 400 $cm^{-1}$)
 Resolution: 4 $cm^{-1}$
 Number of integration events: 100 events With respect to the spectrum obtained, the intensity of a peak top at around 950 $cm^{-1}$ based on a Si—OH group was standardized using the intensity of a peak top at around 1100 $cm^{-1}$ based on a Si—O—Si bond. The value thus obtained hereinafter is described as "IR peak intensity ratio".

Example 2

First, 25.00 g of tetraethoxysilane (manufactured by Shin-Etsu Chemical Co., Ltd.), 4.50 g of Ethyl silicate 40 (manufactured by COLCOAT CO., LTD), 17.62 g of pure water, 0.10 g of concentrated hydrochloric acid (35 mass %, manufactured by KANTO CHEMICAL CO., INC.), and 1.26 g of a polyether phosphate polymer (SOLSPERSE 41000 manufactured by Lubrizol Japan Ltd.) were added to 51.52 g of ethyl alcohol (manufactured by KATAYAMA CHEMICAL, Inc.). This was stirred at 20° C. for four hours and thus a film-forming solution was obtained.

"Ethyl silicate 40" used herein is represented by the molecular formula below, wherein n=5 on average, and is a transparent and colorless liquid containing 40 mass % of silica in terms of $SiO_2$. Furthermore, it contains condensates with a branch or cyclic structure in addition to condensates with a chain structure. Ethyl silicate 40 is characterized by the fact that it is excellent in silica supply efficiency, viscosity, specific gravity, preservation stability and product cost, and is easy to handle when being used.

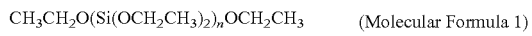

$CH_3CH_2O(Si(OCH_2CH_3)_2)_nOCH_2CH_3$ (Molecular Formula 1)

A film was formed on a glass substrate in the same manner as Example 1. The film thus obtained was a film that had a practical thickness ($A_m$) of 1240 nm with high transparency, and was free from cracks. The obtained film was measured for characteristics in the same manner as Example 1. Table 1 indicates the composition of the film-forming solution. Table 2 indicates the measurement values obtained.

Example 3

First, 36.11 g of tetraethoxysilane (manufactured by Shin-Etsu Chemical Co., Ltd.), 6.50 g of Ethyl silicate 40 (manufactured by COLCOAT CO., LTD), 25.65 g of pure water, 0.10 g of concentrated hydrochloric acid (35 mass %, manufactured by KANTO CHEMICAL CO., INC.), and 5.20 g of a polyether phosphate polymer (SOLSPERSE 41000 manufactured by Lubrizol Japan Ltd.) were added to 26.43 g of ethyl alcohol (manufactured by KATAYAMA CHEMICAL, Inc.). This was stirred at 20° C. for four hours and thus a film-forming solution was obtained.

A film was formed on a glass substrate in the same manner as Example 1. The film thus obtained was a film that had a practical thickness ($A_m$) of 2880 nm with high transparency, and was free from cracks. The obtained film was measured for characteristics in the same manner as Example 1. Table 1 indicates the composition of the film-forming solution. Table 2 indicates the measurement values obtained.

Comparative Example 1

Comparative Example 1 is an example where no organic polymer is added.

First, 31.25 g of tetraethoxysilane (manufactured by Shin-Etsu Chemical Co., Ltd.), 17.62 g of pure water, and 0.10 g of concentrated hydrochloric acid (35 mass %, manufactured by KANTO CHEMICAL CO., INC.) were added to 51.03 g of ethyl alcohol (manufactured by KATAYAMA CHEMICAL, Inc.). This was stirred at 20° C. for four hours and thus a film-forming solution was obtained.

A film was formed on a glass substrate in the same manner as Example 1. However, the film thus obtained had cracks accompanied by separation.

Comparative Example 2

Comparative Example 2 is an example where excess organic polymer was added with respect to $SiO_2$ contained in silicon alkoxide.

First, 17.36 g of tetraethoxysilane (manufactured by Shin-Etsu Chemical Co., Ltd.), 10.20 g of pure water, 0.10 g of concentrated hydrochloric acid (35 mass %, manufactured by KANTO CHEMICAL CO., INC.), and 2.00 g of a polyether phosphate polymer (manufactured by Lubrizol Japan Ltd.; SOLSPERSE 41000) were added to 70.34 g of ethyl alcohol (manufactured by KATAYAMA CHEMICAL, Inc.). This was stirred at 20° C. for four hours and thus a film-forming solution was obtained.

A film was formed on a glass substrate in the same manner as Example 1. The film thus obtained was a film that had a practical thickness ($A_m$) of 830 nm with high transparency, and was free from cracks. The obtained film was measured for characteristics in the same manner as Example 1. Table 1 indicates the composition of the film-forming solution. Table 2 indicates the measurement values obtained.

Comparative Example 3

Comparative Example 3 is an example where no heat treatment was performed.

A film was formed on a glass substrate in the same manner as Example 1, except that no heating with an oven (heat treatment) was performed after drying at room temperature.

The film thus obtained was a film that had a practical thickness ($A_m$) of 770 nm with high transparency, and was free from cracks. The obtained film was measured for characteristics in the same manner as Example 1. Table 1 indicates the composition of the film-forming solution. Table 2 indicates the measurement values obtained.

In Comparative Examples 1 and 2, the XRD ratio at low angle/at high angle ratio exceeded (0.19 $A_m$+0.03). This indicates that the ratio of the micro-pores was too high in the film. In Comparative Example 1, cracks occurred because the shrinking percentage of the film became high due to the absence of organic material. It is understood that an organic polymer can play an important role in order to form a film that has excellent mechanical strength while thickening the film. However, the ratio of the micro-pores adversely increases when the content of the organic polymer is too high. It should be noted that the mechanical strength of the film decreases when excess organic polymer was contained therein, as in Comparative Example 2.

In Comparative Example 3, the Si—O—Si bond was not formed sufficiently in the film, thus sufficiently high mechanical strength was not obtained although the micro-pores were small in number. Heat treatment is just needed in order to form a Si—O—Si bond from a Si—OH group. However, heat treatment shrinks the film. In a case where the film is thick, in particular, film shrinkage that accompanies the heat treatment is increased, and thus the cracks tend to occur in the film. In Comparative Examples 1 to 3, a Si—OH group was successfully transformed to a Si—O—Si bond while shrinkage of the film was being prevented, thereby high mechanical strength was achieved.

TABLE 1

|  | Silicon alkoxide (mass %) | Proton concentration (mol/kg) | Organic Polymer concentration (mass %) | Water (to Si content; molar ratio) | $SiO_2$ oligomer mass-average molecular weight | Heat treatment temperature (° C.) |
| --- | --- | --- | --- | --- | --- | --- |
| Example 1 | 5 | 0.010 | 3 | 7.0 | 329 | 200 |
| Example 2 | 9 | 0.013 | 14 | 6.6 | 395 | 200 |
| Example 3 | 13 | 0.024 | 40 | 6.6 | 791 | 200 |
| Comparative Example 1 | 9 | 0.010 | 0 | 6.6 | 390 | 200 |
| Comparative Example 2 | 5 | 0.015 | 40 | 7.0 | — (Not measured) | 200 |
| Comparative Example 3 | 5 | 0.010 | 3 | 7.0 | 329 | — |

"Organic polymer concentration" indicates a value with respect to $SiO_2$ contained in the solution. The value of (5B-5) in Example 3 was 60, where the content of silicon alkoxide (13%) was applied as the value of B.
Stirring period for the solution is four hours in all cases.

TABLE 2

|  | Film thickness (μm) | Content of organic material in the film (mass %) | XRD ratio at low angle/ at high angle | IR peak intensity ratio | Cracks |
| --- | --- | --- | --- | --- | --- |
| Example 1 | 0.46 | 2.9 | 0.0737 (0.1174) | 0.06 | Not observed |
| Example 2 | 1.24 | 12.3 | 0.2128 (0.2656) | 0.11 | Not observed |
| Example 3 | 2.88 | 28.6 | 0.5203 (0.5772) | 0.13 | Not observed |
| Comparative Example 1 | — | 0 | 0.3270 (0.1915) | 0.10 | Observed |
| Comparative Example 2 | 0.83 | 28.6 | 0.2304 (0.1877) | 0.14 | Not observed |
| Comparative Example 3 | 0.77 | 2.9 | 0.1245 (0.1763) | 0.28 | Not observed |

|  | Film separation after Taber test | Haze ratio before Taber test (%) | Haze ratio after Taber test (%) |
| --- | --- | --- | --- |
| Example 1 | Not observed | 0.1 | 0.9 |
| Example 2 | Not observed | 0.1 | 1.1 |
| Example 3 | Not observed | 0.1 | 2.5 |
| Comparative Example 1 | — | — | — |
| Comparative Example 2 | Observed | 0.2 | — |
| Comparative Example 3 | Observed | 0.1 | — |
| Glass sheet | — | 0.0 | 1.5 |

The numeral in the parentheses at the column of "ratio at low angle/at high angle" is the values of $(0.19 A_m + 0.03)$, where $A_m$ (μm) is the practical thickness of the film.
The value of "Content of organic material in the film" was estimated from the content in the solution.

In Comparative Examples 1 to 3, the mass-average molecular weight of the silicon alkoxide in the film-forming solution was measured using a gel permeation chromatography (GPC) after stirring but before applying the solution. The results are also indicated in Table 1.

Comparative Example 4

Comparative Example 4 is an example where HAS-10 (manufactured by COLCOAT Co., Ltd., concentration in terms of $SiO_2$: 10%, proton concentration: 20 to 30 ppm, solvent (isopropyl alcohol/ethanol/methanol: 71/16.512.5)), a commercially-available sol-gel material, was used as SiO2 material.

First, 50.00 g of HAS-10 (manufactured by COLCOAT Co., Ltd.) and 0.15 g of a polyether phosphate polymer (SOL-SPERSE 41000 manufactured by Lubrizol Japan Ltd.) were added to 49.85 g of ethyl alcohol (manufactured by KATAYAMA CHEMICAL, Inc.). This was stirred at 20° C. for four hours and thus a film-forming solution was obtained. The mass-average molecular weight of the silicon alkoxide in the film-forming solution was 21700, exceeding 20000, when it was measured using GPC after stirring but before applying the solution. The content (in terms of silica) of the silicon alkoxide (tetraethoxysilane), proton concentration and organic polymer concentration in the solution are indicated in Table 3. The proton concentration in HAS-10 was assumed to be 25 ppm for calculation.

A film was formed on a glass substrate in the same manner as Example 1. The film thus obtained was a film that had a practical thickness ($A_m$) of 770 nm with high transparency, and was free from cracks. The obtained film was measured for characteristics in the same manner as Example 1. Table 4 indicates the measurement values obtained.

TABLE 3

| | Silicon alkoxide (mass %) | Proton concentration (mol/kg) | Organic polymer concentration (mass %) | Water (to Si content; molar ratio) | SiO$_2$ oligomer mass-average molecular weight | Heat treatment temperature (° C.) |
|---|---|---|---|---|---|---|
| Comparative Example 4 | 5 | 0.013 | 3 | 0.0 | 21700 | 200 |

"Organic polymer concentration" indicates a value with respect to SiO$_2$ contained in the solution.
Stirring period for the solution is four hours in all cases.

TABLE 4

| | Film thickness (μm) | Content of organic material in the film (mass %) | XRD ratio at low angle/ at high angle | IR peak intensity ratio | Cracks | Film separation after Taber test |
|---|---|---|---|---|---|---|
| Comparative Example 4 | 0.77 | 2.9 | 0.2358 (0.1763) | 0.07 | Not observed | Observed |

The numeral in the parentheses at the column of "ratio at low angle/at high angle" is the values of $(0.19 A_m + 0.03)$, where $A_m$ (μm) is the practical thickness of the film.
The value of "Content or organic material in the film" was estimated from the content in the solution.

In Comparative Example 4, the ratio of the micro-pores in the film increased due to the high average molecular weight of silicon alkoxide in the solution. Reflecting this, the XRD ratio at low angle/at high angle increased, exceeding $0.19A_m+0.03$. As a result, the mechanical strength of the film was not enhanced.

Also in the case where silicon alkoxide is used as silicon material instead of HAS-10, the average molecular weight of the oligomer based on silicon alkoxide increases unless the stirring period for the film-forming solution is controlled to be short. Therefore, as in the case with Comparative Example 4, high mechanical strength cannot be obtained.

Example 4

First, 3.472 g of tetraethoxysilane (manufactured by Shin-Etsu Chemical Co., Ltd.), 10.00 g of Ethyl silicate 40 (manufactured by COLCOAT CO., LTD), 0.550 g of a polyether phosphate polymer (SOLSPERSE 41000 manufactured by Lubrizol Japan Ltd.), 0.075 g of polyethylene glycol 200 (manufactured by KATAYAMA CHEMICAL, Inc.), 0.10 g of concentrated hydrochloric acid (35 mass %, manufactured by KANTO CHEMICAL CO., INC.), 15.980 g of pure water, 63.573 g of ethyl alcohol (manufactured by KATAYAMA CHEMICAL, Inc.), and 6.250 g of a fine ITO particle dispersant (an ethyl alcohol solution containing 40 mass % of ITO, manufactured by Mitsubishi Materials Corporation) were mixed, stirred at 20° C. for four hours, and thus a film-forming solution was obtained.

A film was formed on a glass substrate in the same manner as Example 1. The film thus obtained was a film that had a practical thickness ($A_m$) of 670 nm with high transparency, and was free from cracks. The obtained film was measured for characteristics in the same manner as Example 1. Table 5 indicates the composition of the film-forming solution. Table 6 indicates the measurement values obtained.

In this example and Comparative Example 5, the volume ratio of the components in the film other than ITO, more specifically, organic polymer (SOLSPERSE 4100, polyethylene glycol 200) and SiO$_2$ was calculated. And then it was multiplied by the practical film thickness ($A_m$) to obtain a converted film thickness ($A_c$). The volume ratio was estimated from the density ratio among ITO, SiO$_2$ and organic polymer, and from their mass ratio in the film. For the density ratio, an approximate value of 7:2:1 was used based on the fact that the density of ITO crystal, SiO$_2$ glass, SOLSPERSE 4100 and polyethylene glycol 200 is 7.1 g·cm$^{-3}$, 2.2 g·cm$^{-3}$, 1.079 g·cm$^{-3}$ and 1.13 g·cm$^{-3}$ respectively.

Comparative Example 5

Example 5 is an example where excess organic polymer was added with respect to the amount of SiO$_2$ contained in silicon alkoxide while ITO was added.

First, 3.472 g of tetraethoxysilane (manufactured by Shin-Etsu Chemical Co., Ltd.), 10.00 g of Ethyl silicate 40 (manufactured by COLCOAT CO., LTD), 1.50 g of a polyether phosphate polymer (SOLSPERSE 41000 manufactured by Lubrizol Japan Ltd.), 0.075 g of polyethylene glycol 200 (KATAYAMA CHEMICAL, Inc.), 0.10 g of concentrated hydrochloric acid (35 mass %, manufactured by KANTO CHEMICAL CO., INC.), 15.980 g of pure water, 62.623 g of ethyl alcohol (manufactured by KATAYAMA CHEMICAL, Inc.) and 6.250 g of a fine ITO particle dispersant (an ethyl alcohol solution containing 40 mass % of ITO, manufactured by Mitsubishi Materials Corporation) were mixed, stirred at 20° C. for four hours, and thus a film-forming solution was obtained.

A film was formed on a glass substrate in the same manner as Example 1. The film thus obtained was a film that had a practical thickness ($A_m$) of 880 nm with high transparency, and was free from cracks. The obtained film was measured for characteristics in the same manner as Example 1. Table 5 indicates the composition of the film-forming solution. Table 6 indicates the measurement values obtained.

TABLE 5

|  | Silicon alkoxide (mass %) | Proton concentration (mol/kg) | Organic polymer concentration (mass %) | ITO (mass %) | Water (to Si content; molar ratio) | SiO$_2$ oligomer mass-average molecular weight |
|---|---|---|---|---|---|---|
| Example 4 | 5 | 0.011 | 12.5 (8.3) | 2.5 | 10.9 | 413 |
| Comparative Example 5 | 5 | 0.014 | 31.5 (21.0) | 2.5 | 10.9 | — (Not measured) |

"Organic polymer concentration" indicates a value with respect to SiO$_2$ contained in the solution. The numeral in the parentheses is the value with respect to the sum of SiO$_2$ and ITO in the solution.
Heat treatment temperature is 200° C. and stirring period for the solution is four hours in each case.

TABLE 6

|  | Film thickness (μm) | Content of organic material in the film (mass %) | Volume ratio of organic polymer and SiO$_2$ (%) | XRD ratio at low angle/ at high angle | IR peak intensity ratio |
|---|---|---|---|---|---|
| Example 4 | 0.67 | 7.7 | 89.7 | 0.08 (0.14) | 0.10 |
| Comparative Example 5 | 0.88 | 17.4 | 91.9 | 0.20 (0.18) | — (Not measured) |

|  | Cracks | Film separation after Taber test | Haze ratio before Taber test (%) | Haze ratio after Taber test (%) |
|---|---|---|---|---|
| Example 4 | Not observed | Not observed | 0.2 | 3.2 |
| Comparative Example 5 | Not observed | Observed | 0.2 | 3.0 |

The numeral in the parentheses at the column of "ratio at low angle/at high angle" is the values of $(0.19 A_m + 0.03)$, where $A_m$ (μm) is the practical thickness of the film.
(Converted film thickness $A_c$) = {(practical film thickness $A_m$) × (volume ratio of organic polymer and SiO$_2$)}
The values of "Content of organic material in the film" and "Volume ratio of organic polymer and SiO$_2$" were estimated from the amount in the solution.

In Comparative Example 5, the XRD ratio at low angle/at high angle ratio exceeded $(0.19 A_c + 0.03)$. This reflects that the ratio of the micro-pores was too high in the film. In Comparative Example 5, it is conceivable that the ratio of the micro-pores increased in the film due to the excess concentration of the organic polymer in the film.

INDUSTRIAL APPLICABILITY

The present invention provides an article with a silica-based film that contains an organic material while having excellent mechanical strength. Hence, the present invention has a significantly high utility value to each field that utilizes various functions that organic materials can provide.

The invention claimed is:

1. An article with an organic-inorganic composite film, the article comprising a glass substrate and an organic-inorganic composite film that is formed on a surface of the substrate and contains an organic material and an inorganic oxide,
   wherein the organic-inorganic composite film contains silica as the inorganic oxide and as a main component of the organic-inorganic composite film,
   the organic-inorganic composite film is a single-layer film and an outermost layer and is formed directly on the substrate, and
   a value of $(0.19A+0.03)$ or lower is obtained through X-ray diffraction analysis on the organic-inorganic composite film, with the X-ray incident angle being fixed at 1° with respect to the surface of the organic-inorganic composite film, when the thickness of the organic-inorganic composite film is denoted as A μm and the intensity of a peak at a diffraction angle of 3° to 10° is standardized using the intensity of a halo pattern peak at a diffraction angle of 20° to 30°, and
   a value of 0.25 or lower is obtained through Fourier transform infrared spectroscopy analysis on the organic-inorganic composite film, when the intensity of a peak at around 950 cm$^{-1}$ based on a Si—OH group is standardized using the intensity of a peak at around 1100 cm$^{-1}$ based on a Si—O—Si bond.

2. The article according to claim 1, wherein the organic-inorganic composite film has a thickness of more than 0.25 μm but not more than 5 μm.

3. The article according to claim 2, wherein the organic-inorganic composite film has a thickness of more than 1 μm but not more than 5 μm.

4. The article according to claim 1, wherein the content of the organic material in the organic-inorganic composite film is 0.1 to 40% with respect to the total mass of the organic-inorganic composite film.

5. The article according to claim 1, wherein a part of the organic material in the organic-inorganic composite film is a hydrophilic organic polymer.

6. The article according to claim 1, wherein the substrate has a thickness of more than 0.1 mm.

7. The article according to claim 1, wherein the organic-inorganic composite film contains a conductive fine particle.

8. The article according to claim 7, wherein the conductive fine particle includes indium tin oxide.

9. An article having an organic-inorganic composite film, the article comprising:
   a substrate; and
   an organic-inorganic composite film that is formed on a surface of the substrate and contains an organic material and an inorganic oxide,
   wherein the organic-inorganic composite film contains silica as the inorganic oxide and as a main component of the organic-inorganic composite film, the organic-inorganic composite film comprises polyether phosphate polymer as the organic material thereof, a value of (0.19A+0.03) or lower is obtained through X-ray diffraction analysis on the organic-inorganic composite film, with the X-ray incident angle being fixed at 1° with respect to the surface of the organic-inorganic composite film, when the thickness of the organic-inorganic composite film is denoted as A μm and the intensity of a peak at a diffraction angle of 3° to 10° is standardized using the intensity of a halo pattern peak at a diffraction angle of 20° to 30°, and a value of 0.25 or lower is obtained through Fourier transform infrared spectroscopy analysis on the organic-inorganic composite film, when the intensity of a peak at around 950 $cm^{-1}$ based on a Si—OH group is standardized using the intensity of a peak at around 1100 $cm^{-1}$ based on a Si—O—Si bond.

* * * * *